United States Patent Office 3,806,489
Patented Apr. 23, 1974

3,806,489
COMPOSITE MATERIALS HAVING AN IMPROVED RESILIENCE
Jean-Philippe Rieux, Decines, and Jean Lehureau, Lyons, France, assignors to Rhone-Progil, Paris, France
No Drawing. Filed May 24, 1973, Ser. No. 363,623
Claims priority, application France, May 31, 1973, 20,193
Int. Cl. C10g 51/10
U.S. Cl. 260—38                    12 Claims

ABSTRACT OF THE DISCLOSURE

Composite materials having improved resilience comprising a continuous phase or matrix and reinforcing means contiguous to and firmly bonded to the matrix, said reinforcing means comprising carbon fibers which have been sized with elastomer-type epoxy resins.

BACKGROUND OF THE INVENTION

Field of the invention

The present invention relates to composite materials employing carbon as reinforcing means and more especially carbon having an improved surface, associated with a continuous phase or matrix comprising macromolecular organic compounds.

Description of the prior art

By the term "composite article" is meant a heterogeneous assembly comprised of two or more components, at least one of which defines a continuous phase which is hereinafter designated as the "matrix" component, and at least one other component defining reinforcing means or reinforcement for the said composite assembly, the reinforcing means being contiguous to and firmly bonded to the matrix component. For example, the respective components of such composite assemblies can be either coated, layered, stratified and/or laminated, randomly filled and the like.

The matrix material is usually a thermosetting synthetic resinous material and the reinforcing means or reinforcement can be of any form such as fibrous, felt, or fabric in nature and of diverse origin, e.g., glass, carbon, synthetic fabric and the like. Exemplary of other compositions or composite assemblies are metal-carbon, metal-fiber and the like. Also representative of such composites are those fabricated utilizing an adhesive and in which the adhesive defines the continuous phase or serves as the matrix therefor.

The most common type of composite comprises a continuous matrix or binder phase having distributed therein or otherwise bonded thereto reinforcing means comprising fibers which may be composed of various materials.

By way of background, in the prior art composites or composite assemblies it is known that the reinforcing means or reinforcement enhances such properties as tensile strength and/or bending strength, but that these properties nevertheless evidence values considerably lower than the theoretical value which is calculated on the basis of the actual strength of the reinforcing means and its proportion among the materials comprising the composite. This loss in such properties is moreover known to be especially due to the lack of adhesion between the matrix component and the reinforcing means comprising the composite. If, on the one hand, the inherent properties of the matrix, and on the other hand, those of the reinforcement play a considerable role in the transfer of force from one component to the other, the degree of interaction between the two components is also determinative. In an effort to improve upon the aforesaid degree of interaction, the prior art is replete with attempts to modify the physical properties of various composites by performing a variety of surface treatments upon the reinforcement or reinforcing means comprising the same, and which include various chemical, electrochemical, mechanical and other treatments. Unfortunately, the results which have been obtained to date can be deemed to be generally inadequate, otherwise defficient, and/or are not readily reproducible. A need therefore exists for improving the physical properties of composites to align these properties more closely to the theoretical.

Further, by improving the adhesion between the matrix and the reinforcement it is possible to obtain highly performing structures; nevertheless, given the important difference between expansion coefficients and also between elasticity moduli, a direct coupling of the matrix material with the reinforcement (e.g., fibers may lead to a composite material having poor shock resistance and one which tends to crack and exhibit separation at the matrix/reinforcement interface.

For the purpose of improving interaction between the reinforcement and the matrix, it is known to submit carbon reinforcement to a surface treatment and especially to an electrochemical treatment which may be achieved in two steps, the carbon being first connected as an anode in the electrolysis of an aqueous electrolyte solution, then being coupled only by current reversion, as a cathode in same electrolyte. This process results in composite materials having good bending and cutting properties and is more fully disclosed in a copending application, by the same inventors, filed Apr. 12, 1973, Ser. No. 350,521 (based on French patent application No. 7214950 filed Apr. 21, 1972). Said copending application is incorporated herein by reference.

Unhappily, resilience is not high enough for some contemplated industrial uses needing resilient materials having moreover a good impact resistance (for example, air applications).

SUMMARY OF THE INVENTION

It is therefore a primary object of the present invention to provide composite materials having an improved resilience.

It is a further object of this invention to provide an improved composite assembly whose physical properties more closely conform to the original.

Still another object of the present invention is to provide carbon fiber reinforcing materials for use in composite assemblies wherein said carbon fibers exhibit good compatibility with an improved adhesiveness to various matrix materials.

Other objects and advantages will become apparent from the ensuing description.

The above objects are realized by the present invention which provides a composite assembly having improved resilience comprising a continuous matrix component comprising a macromolecular organic compound and, contiguous thereto and firmly bonded thereto, reinforcing material comprising carbon fibers which have been previously sized with epoxy resins of the elastomer type. The sizing agent (i.e., the epoxy resin) improves the properties of the composite by functioning as a tension damper between the matrix and the reinforcement.

DESCRIPTION OF THE PREFERRED EMBODIMENT

The composite reinforced assemblies of the present invention may be the type which is most common in the art; i.e., they comprise generally fibrous reinforcing elements distributed throughout a solid matrix of a binder material. The binder material may generally be characterized as a macromolecular organic compound or polymer and is preferably a synthetic resin, thermosetting synthetic resin being most preferred. Exemplary of the preferred thermosetting synthetic resins are phenol-formaldehyde resins, urea-formaldehyde resins, melamine-formaldehyde resins, epoxy resins, polycarbonates, polyesters, polyurethanes and the like. The particular thermosetting resin employed in the present invention is not critical, and the present invention is applicable to any thermosetting synthetic resin which is compatible with the reinforcing material of the present invention and which is capable of being formed into a composite reinforced assembly with the reinforcing material of the present invention.

The reinforcing material generally may be characterized as carbon fibers which are well known to those skilled in the art. The size of the carbon fibers is not particularly limited as the present invention is applicable to carbon fibers having any size as long as the carbon fibers employed function to reinforce the composite assembly of the present invention. Typically, the carbon fibers have a length of from about 10 to about 1000 millimeters and a diameter of from about 0.001 to 0.003 millimeters. Any type of known and conventional carbon fibers can be employed in the present invention.

Thus, the composition of the present invention or the composite assembly of the present invention comprises the matrix component, the reinforcing material which comprises carbon fibers and the sizing agent for the carbon fibers. The carbon fibers are normally present in the composition in an amount of from about 10 to about 80% by weight, based on the weight of the composition. The particular amount of carbon fibers employed may be varied within these ranges depending upon the results desired.

The composite reinforced assembly of the present invention may be made by first sizing the carbon fiber reinforcing elements with the epoxy resin sizing agent followed by forming the assembly of the sized carbon fibers with the matrix component. As an optional step, the carbon fibers, prior to being sized, can be treated in accordance with the electrochemical treatment disclosed in said Rieux et al. copending application Ser. No. 350,521.

More precisely, as disclosed in said copending application, a conventional electrolytic apparatus is provided which comprises two electrodes in an aqueous solution of an electrolyte contained in a conventional electrolysis vessel. One of the electrodes is composed of a material which is chemically inert, while the other electrode is composed of the carbon fibers to be treated. In addition of course, there is included a current source, preferably a source of direct current, with a voltage stabilizer and a changeover switch to alternate the polarity between the two electrodes such that each electrode can alternatively be caused to function as the anode and thereafter as the cathode. A source of periodically reversing current, particularly conventional alternating current, can be employed to accomplish this same result.

In the first stage of this electromechanical treatment, the carbon fibers, in the form of a bundle thereof, is placed in the electrolytic cell and connected to the source of current as the anode. The other inert electrode functions in the first stage as a cathode, and after the electrolytic cell has been operated for the prescribed period of time, the portion of the process defined as the second stage begins when the bundle of fibers initially acting as the anode is caused to exchange its function and act as the cathode, conveniently by a simple reversal of current. Thus, if a direct current source is employed the second stage can be initiated by reversing the current to reverse the function of the carbon fibers and the other electrode. Alternatively, the same result can be achieved by a current source which periodically reverses such as conventional alternating current.

The treatment can be performed in a batchwise fashion employing a bundle of fibers of relatively short length, or it can also be performed on a continuous basis such as by conveying a continuous bundle of carbon fibers successively through a first electrolytic vessel where the fiber bundle functions as the anode and thereafter through a second vessel, which is electrically independent of the first, wherein the continuous bundle of fibers functions as the cathode. Using this technique, a source of direct current can be employed, with the current in the second vessel being reversed relative to the first. When the treament is continuous, a single vessel may be employed and a source of alternating current can be utilized to achieve the same result since obviously no independent reversal of current is needed.

By the proper selection of the chemical, physical and electrical parameters of the process, a significant modification of the surface characteristics of the fibers is achieved. Typically, a current density of from about 0.005 to about 0.1 ampere per square decimeter is employed, although considerably higher values up to about 1 ampere per square centimeter may be employed for certain types of carbon, such as glassy carbon. When direct current is used, the duration of current flow in the first stage where the carbon fibers function as the anode typically ranges from about 1 to 10 minutes and will vary within this range depending upon the current density chosen. In the second stage, in the second vessel, where the carbon fibers function as the cathode, the duration of current flow is chosen between about 15 seconds and 10 minutes. When alternating current is employed, and a single vessel is used, the duration of the current flow ranges between about 1 and 20 minutes.

When the carbon fibers are connected as the anode in the cell, the negative ions (of the electrolyte), by means of an oxidation action, effect a modification of the surface characteristics of the carbon. Upon the reversal of the current, when the carbon fibers are then coupled as the cathode of the electrolytic cell, there occurs a particularly effective removal of the residues of carbon which appear in powder form during the first stage of the treatment process. It is necessary to limit the times of oxidation in the first stage in order to prevent a too significant degradation of the carbon substrate, which would disadvantageously lead to a decrease in the mechanical properties thereof. On the other hand, in the second stage of the electrolytic process in which the surface of the carbon substrate is cleaned without being degraded, the duration of current flow is of less importance and need not be so carefully controlled to prevent overtreatment. Nevertheless, it has been observed that the most advantageous mechanical properties of the resulting composite articles manufactured with the treated carbon fibers are obtianed with fibers which have undergone a treatment wherein the carbon fibers are first connected as an anode in an electrolytic cell containing an aqueous solution of electrolyte, and a source of electrical current, either direct current or alternating current, is then applied to the electrolytic cell for a period of time, and wherein the carbon fibers are next coupled as a cathode in the same electrolyte and the source of electrical energy is again applied to the electrochemical cell. Advantageously, the second stage of treatment is accomplished by a mere reversal of current in the cell.

In either the batchwise or continuous embodiment of this electrochemical treatment, an aqueous electrolyte solution is employed. Any conventional electrolyte solution can be employed in the practice of the present invention, with the particular electrolyte chosen not being critical to the successful operation of this process. The electrolyte solution can be prepared using an acid compound, an alkaline or neutral salt or a basic compound. Typical examples of compounds which can be used to prepare the electrolyte solution include sodium chloride, caustic soda, sulfuric acid, and the like, or mixtures of these compounds. The electrolyte typically contains such compounds at a concentration level of from about 10 to 500 grams per liter of solution.

The carbon fibers are sized with the epoxy resin prior to formation of the composite reinforced assemblies, either with or without the optional electrochemical pre-treatment. The sizing may be performed by contacting the carbon fibers with a solution of the sizing agent, followed by drying of the sized fibers. The sizing agent is generally characterized as an epoxy resin of the elastomer type. By this type of epoxy resin is intended epoxy resin polymers having a linear structure and an epoxy equivalent number (i.e., the number of epoxy groups in the resin per gram thereof) of from 300 to 100,000. Typical examples of such epoxy resins are liquid carboxyl rubbers of the polybutadiene type which contain epoxy groups; epoxy compounds resulting from the condensation of dicarboxylic polyesters with polyglycidic derivatives of phenol or alcohols; compounds resulting from the condensation of polyglycidic derivatives with the condensation product of a linear diisocyanate with amino acids, preferably ω-amino acids. A further example is an epoxy resin of the "phenoxy" type which has a variable content of epoxidic oxygen.

The second type of epoxy resins described above, the condensation products of dicarboxylic polyesters with the polyglycidic derivatives of phenol and other alcohols can be produced as follows. The dicarboxylic polyester reactant can be formed by reacting a dicarboxylic acid with a diol in a molar ratio of $n+1$ moles of the dicarboxylic acid per $n$ moles of the diol. Typical examples of suitable dicarboxylic acids are adipic, sebacic, fumaric, maleic, phthalic or polymerized fatty acids, and mixtures thereof. Typical examples of suitable diols are ethylene glycol, propylene glycol, butylene glycol, diethylene glycol, triethylene glycol, tetraethylene glycol, propane diol, butane diol, pentane diol, hexane diol, and the like, homologs thereof, and mixtures thereof. The resulting dicarboxylic or oleic (as they are sometimes called), polyesters are then condensed with a polyglycidic derivative of phenol or an alcohol such as bisphenol glycidic ethers, an example of which is the diglycidic ether of bisphenol A. Generally, such bisphenol glycidic ethers are the condensation product of bisphenol with an epihalohydrin, particularly epichlorohydrin, or the condensation product of bisphenol with an alkylene oxide. The molar ratio of the polyester to the polyglycidic compounds can be varied as desired depending upon the type of epoxy resin desired and depending upon the desired epoxide group content.

The epoxy resin sizing agent preferred is the condensation product of a dicarboxylic polyester and a bisphenol A diglycidic ether. It has been found that such epoxy resins provide exceptionally good results since they are very compatible with the matrix components employed, a factor which is necessary to obtain composite reinforced materials of improved mechanical properties.

Any of the above types of epoxy resins, or equivalent epoxy resins, can be employed as the sizing agent in the present invention. The carbon fibers, with or without the optional electrochemical pre-treatment, are merely contacted with a solution of the epoxy resin sizing agent for a non-critical period of time. Any material which is a solvent for the epoxy resin chosen as the sizing agent can be employed to form the solution, and typical examples of operable solvents are as follows: ketones, esters, ethers, halogenated hydrocarbons, linear and ramified alcohols, aromatic solvents, etc.

The carbon fibers are then dried to remove the solvent for the epoxy resin sizing agent and the carbon fibers are then ready for the formation of the composite reinforced assembly of the present invention. This composite reinforced assembly has improved mechanical properties, especially an improved resilience and good bending and cutting properties. The following examples illustrate the present invention without limiting it, and they should be construed as being merely illustrative in scope. The carbon fibers which are employed in all of the following examples are high modulus carbon fibers having a length of 10 millimeters and a diameter of 0.001 millimeter, and have previously been subjected to the above-described electrochemical treatment in the electrolysis of an aqueous solution containing 50 grams per liter of solution of sodium chloride and 2.5 grams per liter of solution of caustic soda. The time of the first stage (where the carbon fibers function as the anode) was 3 minutes while the time for the second stage was also 3 minutes.

EXAMPLE 1

A bundle of carbon fibers (2 g.) is put in a mold, and onto those fibers is cast a sizing agent solution of the composition:

10 g. of sizing resin comprising the condensation product of 1 mole of a butanediol adipate polyester with 2 moles diepoxided bisphenol A.
2.8 g. of nadic methyl anhydride.
0.2 g. of dimethylaminomethylphenol.

made up to 100 g. by the addition of methylethylketone (solvent).

After sizing, the solvent is allowed to evaporate during 15 hours at 25° C., then the temperature is increased to 100° C. and is maintained for 1 hour to evaporate the solvent completely.

A bundle of supple fibers is obtained onto which is cast an epoxy matrix composed of the following mixtures:

| | G. |
|---|---|
| Epoxy resin based upon diepoxided bisphenol A | 10 |
| Nadic methyl anhydride | 8.2 |
| Dimethylaminomethylphenol | 0.2 |

The mold is filled with this resin which is cast at 100° C. Then the whole is maintained at 100° C. for 1.5 hours and 180° C. for 4 hours.

EXAMPLE 2

A bundle of carbon fibers (2 g.) is put in a mould, and onto those fibers is cast a solution of sizing agent comprising:

10 g. of the sizing resin according to Example 1.
0.7 g. of aminoethylpiperazine.

made up to 100 g. by methylethylketone (solvent) addition.

After fiber coating, the solvent is evaporated during 15 hours at 25° C., then the temperature is increased up to 100° C. and is maintained during one hour in order to evaporate the solvent completely.

A bundle of supple fibers is obtained onto which is cast an epoxy matrix composed of the following mixture:

| | G. |
|---|---|
| Epoxy resin based upon diepoxided bisphenol A | 10 |
| Aminoethylpiperazine | 1.8 | this matrix being diluted in methylethylketone in weight ratio:matrix 80/methylethylketone 20.

The mould is filled with this resin which is cast at 100° C. Then the whole is maintained at 100° C. for 1.5 hours and 180° C. for 4 hours.

EXAMPLE 3

Example 1 was repeated except that the epoxy matrix was replaced by the following one:

| | G. |
|---|---|
| Trimethylolpropane triglycidic ether | 10 |
| Methyl nadic anhydride | 11 |
| Dimethylaminomethylphenol | 0.2 |

EXAMPLE 4

A bundle of carbon fibers (2 g.) is put in a mould and onto those fibers is cast a sizing agent solution of the composition:

10 g. of a sizing resin comprising the condensation product of 1 mole of a hexanediol sebacate polyester with 2 moles of diepoxided bisphenol A.
2.0 g. of methyl nadic anhydride.
0.2 g. of dimethylaminomethylphenol.

made up to 100 g. by methylethylketone (solvent) addition.

After fiber coating, the solvent is allowed to evaporate during 15 hours at 25° C., then the temperature is increased up to 100° C. and is maintained during one hour in order to evaporate the solvent completely.

A bundle of supple fibers is obtained onto which an epoxy matrix composed of the following mixture is cast:

| | G. |
|---|---|
| Epoxy resin based upon diepoxided bisphenol A | 10 |
| Methyl nadic anhydride | 8.2 |
| Dimethylaminomethylphenol | 0.2 |

The mould is filled with this resin which is cast at 100° C. Then the whole is maintained at 100° C. during 1.5 hours and at 180° C. during 4 hours.

EXAMPLE 5

Example 1 was repeated, but with a bundle of carbon fibers not having been submitted to the electrochemical treatment.

Bending and cutting resistance tests were conducted on the composite materials of Examples 1–5 as well as volume resilience tests.

The bending resistance tests were made on test-tubes of 100 x 12.5 x 1.3 mm. with a distance between supports of 50 millimeters.

Cutting tests (measure of bending near supports expressing a breaking of fiber cohesion, which gives rise to a cutting) were made on test-tubes of 25 x 12.5 x 1.3 millimeters with a distance between supports of 10 millimeters.

In the two cases, the extension speed of the test machine was 0.05 centimeter per minute at a temperature of 20° C.

The tests of volume resilence, i.e., the ratio of tearing energy to the volume under constraint, were made on a Dynstate device with a ratio of $D/h=6$, test-tube dimensions $h$ and distance between supports D, test-tubes being parallelepipeds having dimensions of 15 x 10 x 1.3 millimeters.

The results are given in the following table:

| | Composition of the composite material (percent by weight) | Bending resistance (kg./mm.²) | Cutting resistance (kg./mm.²) | Volume resilience (kg.-cm./cm.³) |
|---|---|---|---|---|
| Example 1 | 75% fibers / 25% matrix / 0% sizing | 100 | 8.4 | 9 |
| Do | 75% fibers / 2% sizing / 23% matrix | 94 | 8 | 10.7 |
| Do | 75% fibers / 5% sizing / 20% matrix | 97 | 7.9 | 15.7 |
| Do | 75% fibers / 10% sizing / 15% matrix | 90 | 7.8 | 17 |
| Example 2 | 75% fibers / 0% sizing / 25% matrix | 97 | 8 | 17 |
| Do | 75% fibers / 5% sizing / 20% matrix | 90 | 7.4 | 19.5 |
| Do | 75% fibers / 10% sizing / 15% matrix | 79 | 6.4 | 21 |
| Example 3 | 75% fibers / 0% sizing / 25% matrix | 96 | 8.10 | 9.6 |
| Do | 75% fibers / 10% sizing / 15% matrix | 90 | 7.9 | 16 |
| Example 4 | 75% fibers / 10% sizing / 15% matrix | 89 | 7.7 | 17.2 |
| Example 5 | 75% fibers / 25% matrix / 0% sizing | Material macroscopically heterogeneous. Too high percentage of fibers. | | |
| Do | 70% fibers / 30% matrix | 58 | 2.4 | 27 |
| Do | 70% fibers / 12% sizing / 18% matrix | 62.5 | 2.8 | 30 |

The table shows that the progressive increasing of the amount of sizing on the adhesive carbon fibers regularly decreases the bending and cutting resistance which however remain very acceptable, and improves in an important way the volume resilience of the composite material.

In the case of non-adhesive carbon fibers, bending and cutting resistances of the composite materials are generally low while the volume resilience is quite fairly improved.

While the invention has been described with respect to preferred embodiments, it is to be understood that various modifications may be made (e.g., in the epoxy resins used and with different matrix materials) without departing from the spirit and scope of the present invention, as defined by the appended claims.

What is claimed is:

1. Composite reinforced materials of improved resilience comprising a continuous matrix of a thermosetting synthetic resin and a reinforcing agent contiguous thereto and firmly bonded thereto, said reinforcing agent comprising carbon fibers sized with a linear epoxy resin having an epoxy equivalent number of from about 300 to 100,000 epoxy groups per mole of resin.

2. The composite reinforced materials of claim 1 wherein said reinforcing agent is distributed throughout said continuous matrix.

3. The composite reinforced materials of claim 2 wherein said thermosetting synthetic resin is selected from the group consisting of phenol-formaldehyde resins, urea-formaldehyde resins, melamine-formaldehyde resins, epoxy resins, polycarbonates, polyesters and polyurethanes.

4. The composite reinforced material of claim 2 wherein said epoxy resin is selected from the group consisting of: (1) epoxidized liquid carboxyl rubbers; (2) condensation products of dicarboxylic polyesters with polyglycidic derivatives of phenol and alcohols; and (3) condensation products of glycidic compounds with the condensation product of a linear diisocyanate with amino acids.

5. The composite reinforced materials of claim 2 wherein said epoxy resin is the condensation product of a dicarboxylic polyester with a bisphenol diglycidic ether.

6. The composite reinforced materials of claim 5 wherein said dicarboxylic polyester is the condensation product of a dicarboxylic acid and a diol and wherein said bisphenol diglycidic ether is the condensation product of a bisphenol with an epihalohydrin or an alkylene oxide.

7. The composite reinforced materials of claim 1 wherein said carbon fibers, prior to being sized with said epoxy resin, are subjected to a surface modification by employing said carbon fibers first as the anode in the operation of an electrolytic cell having an aqueous electrolyte solution and then as the cathode.

8. The composite reinforced materials of claim 6 wherein said dicarboxylic acid is selected from the group consisting of adipic, sebacic, fumaric, maleic and phthalic acids, polymerized fatty acids and mixtures thereof; and wherein said diol is selected from the group consisting of a glycol, an alkanediol and mixtures thereof.

9. The composite reinforced materials of claim 2 wherein said carbon fibers have a length of from about 10 to 1,000 mm. and a diameter of from about 0.001 to 0.003 mm.

10. The composite reinforced materials of claim 2 wherein the amount of said carbon fibers in said composite reinforced materials is from 10 to 80% by weight, based on the weight of said composite reinforced materials.

11. The composite reinforced materials of claim 6 wherein said dicarboxylic polyester is the condensation product of $(n+1)$ moles of a dicarboxylic acid and $(n)$ moles of a diol.

12. Composite reinforced materials of improved resilience consisting essentially of a continuous matrix of a thermosetting synthetic resin and a reinforcing agent contiguous thereto and firmly bonded thereto, said reinforcing agent consisting essentially of from 10 to 80% by weight, based on the weight of said composite reinforced materials, of carbon fibers sized with a linear epoxy resin having an epoxy equivalent number of from about 300 to about 100,000 epoxy groups per mole of resin.

References Cited

UNITED STATES PATENTS

| | | | |
|---|---|---|---|
| 3,476,703 | 11/1969 | Wadsworth et al. | 260—37 EP |
| 3,660,140 | 5/1972 | Scola et al. | 260—37 EP |
| 3,723,607 | 3/1973 | Kalnin | 260—37 N |

LEWIS T. JACOBS, Primary Examiner

E. S. PARR, Assistant Examiner

U.S. Cl. X.R.

260—37 EP, 37 N, 37 PC, 39 R, 40 R

UNITED STATES PATENT OFFICE
CERTIFICATE OF CORRECTION

Patent No. 3,806,489  Dated April 23, 1974

Inventor(s) Jean-Phillippe Rioux and Jean Lehureau

It is certified that error appears in the above-identified patent and that said Letters Patent are hereby corrected as shown below:

At column 1, line 7, "1973" should read --1972--.

Signed and sealed this 12th day of November 1974.

(SEAL)
Attest:

McCOY M. GIBSON JR.
Attesting Officer

C. MARSHALL DANN
Commissioner of Patents